Oct. 26, 1971   D. H. SCHULER   3,615,031
FORAGE BOX
Filed Jan. 12, 1970
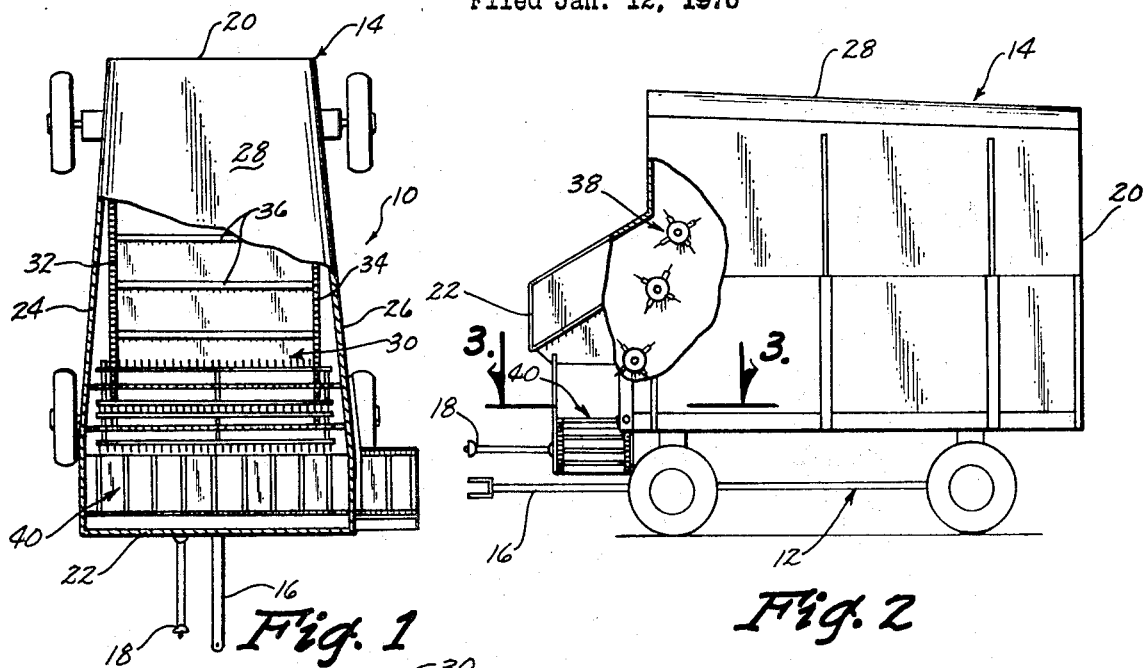
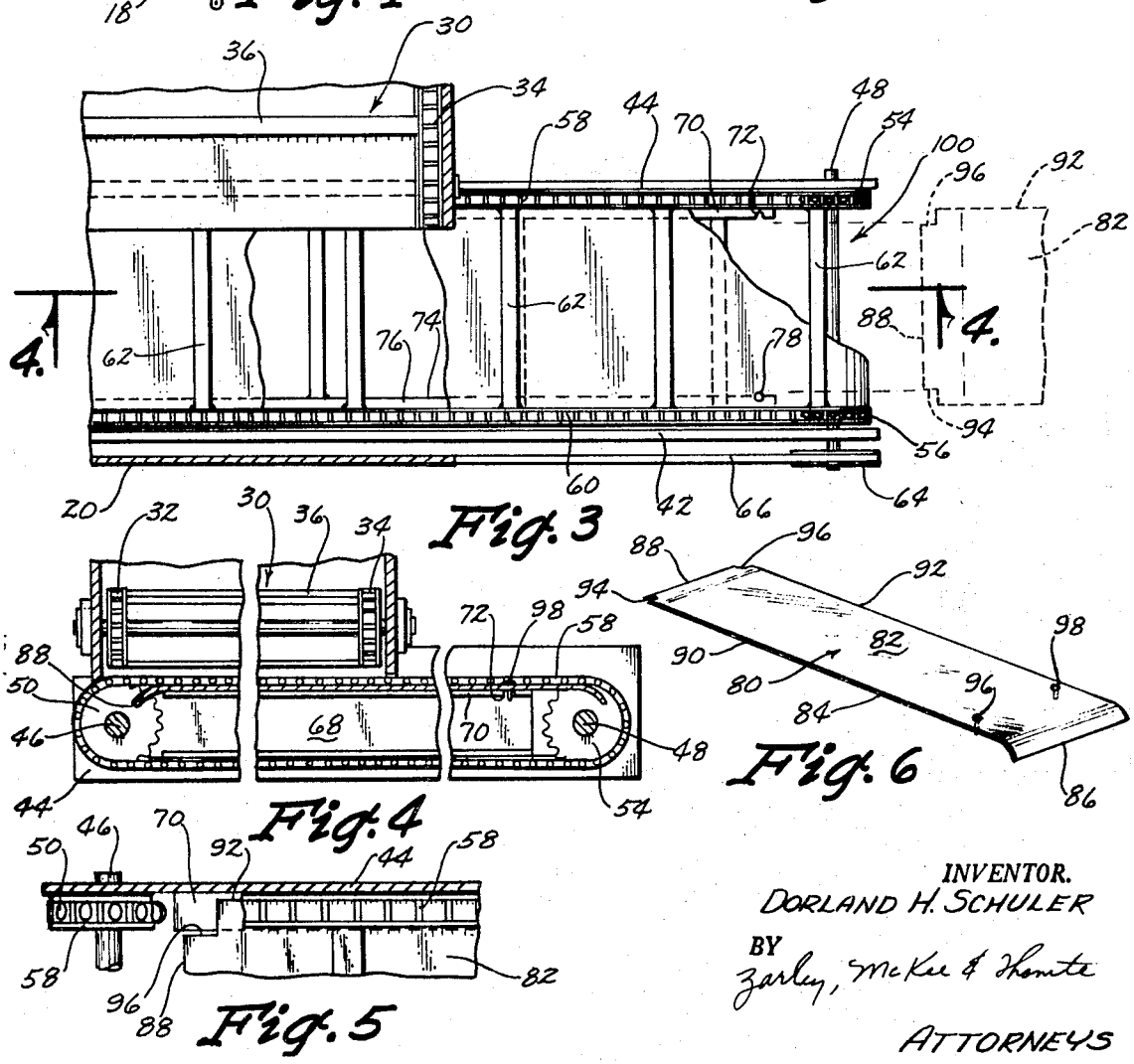
INVENTOR.
DORLAND H. SCHULER
BY Zarley, McKee & Thomte
ATTORNEYS United States Patent Office 3,615,031
Patented Oct. 26, 1971

3,615,031
FORAGE BOX
Dorland H. Schuler, Griswold, Iowa 51535
Filed Jan. 12, 1970, Ser. No. 2,046
Int. Cl. B60p 1/38
U.S. Cl. 214—519       7 Claims

ABSTRACT OF THE DISCLOSURE

A forage box including a floor conveyor means adapted to convey forage material or the like forwardly to a discharge conveyor means at the forward end of the box. The discharge conveyor means has a discharge end spaced outwardly of one side of the box to facilitate the discharge of material into an elevator or the like. The discharge conveyor means is of the slat and chain type and has a plate means removably mounted thereon which prevents material from passing downwardly therethrough when in position. The plate means is removable so that the material on the discharge conveyor will pass downwardly therethrough into a silo pit or the like when the plate has been removed. The plate means includes means for inserting the plate in the discharge conveyor and also includes means for detachably maintaining the same thereon.

---

Conventional forage wagons or boxes usually employ a front end or cross conveyor for discharging the material from the box into blowers or elevators and include an unloading door at the rearward end thereof to facilitate the dumping or discharge of material therefrom into a pit silo or the like. The vast majority of the conventional forage boxes have straight sides to facilitate unloading rearward as well as from its forward end, which design creates maximum drag in both directions. Additionally, the beater assemblies which are usually provided at the forward end of the boxes do not aid in any manner in discharging the material from the rearward end of the wagon.

Therefore, it is a principal subject of this invention to provide a forage wagon which facilitates the discharge of materials from the forward end thereof into trench silos or elevators and blowers. Also an additional advantage of unloading in only a forward direction, is that the box can be tapered wider in front than the rear, which very substantially reduces friction from drag on the sides, making this an easier pulling and faster unloading wagon.

A further object of this invention is to provide a forage box including a cross conveyor or discharge conveyor at the forward end thereof and having a removable plate mounted thereon to enable the material in the box to be discharged into a trench silo or an elevator as the case may be.

A further object of this invention is to provide a forage box including a cross conveyor means having a plate removably mounted thereon, the plate means including means for facilitating the insertion thereof and means for detachably maintaining the same therein.

A further object of this invention is to provide a forage box which efficiently discharges material therefrom.

A still further object of this invention is to provide a forage box which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top view of the forage box of this invention with a portion thereof cut away to more fully illustrate the invention;

FIG. 2 is a side view of the forage box with portions thereof cut away;

FIG. 3 is an enlarged sectional view as seen along lines 3—3 of FIG. 2;

FIG. 4 is a fragmentary sectional view as seen along lines 4—4 of FIG. 3;

FIG. 5 is a fragmentary top view of the cross conveyor means; and

FIG. 6 is a perspective view of hte plate means which is removably mounted on the cross conveyor means.

The forage box of this invention is generally designated by the reference numeral 10 and includes a wheeled frame means 12 having a box 14 mounted thereon. Frame means 12 includes a forwardly extending tongue 16 to permit the box to be trailed behind a prime mover. The prime mover has a power take-off assembly for connection with the drive shaft 18 to provide driving power for the various conveyors and beaters provided on the box.

Box 14 includes a rearward end 20, forward end 22, and sides 24 and 26. As seen in FIG. 1, the width of the rearward end of the wagon is less than the width of the forward end thereof. Box 14 includes a top portion 28 to prevent the material from being blown from the interior thereof. The numeral 30 generally refers to a floor conveyor or drag chain means comprised of a pair of spaced apart chains 32 and 34 having a plurality of slats 386 secured thereto and extending therebetween as illustrated in FIGS. 1 and 4. Floor conveyor 30 is of conventional design and is suitably mounted at the floor of the box and is adapted to convey material in the box from the rearward end to the forward end thereof.

A beater assembly 38 is provided at the forward end of the box above the forward end of floor conveyor 30 in the manner illustrated in FIGS. 1 and 2 and are adapted to feed the material from the box onto the cross conveyor or discharge conveyor generally referred to by the reference numeral 40. Cross conveyor 40 includes vertically disposed frame members 42 and 44 having shafts 46 and 48 rotatably mounted therein and extending therebetween as illustrated in FIG. 4. Shaft 46 has a pair of sprockets 50 and 52 (now shown) mounted thereon while shaft 48 has a pair of sprockets 54 and 56 mounted thereon. Chain 58 extends around and between the sprockets 50 and 54 while chain 60 extends around and between the sprockets 54 and 56. A plurality of slats 62 are secured to and extend between the chains 58 and 60 in a spaced apart relationship as illustrated in FIG. 3. Shaft 48 has a pulley 64 connected thereto which is driven by a belt 66 operatively connected to the gear box which is driven by the shaft 18 to cause the rotation of the cross conveyor 40.

Channel member 68 is secured to frame member 44 between sprockets 50 and 54 and has a top flange 70 extending inwardly therefrom towards frame member 42. One end of top flange 70 is provided with a slot 72 formed therein adjacent the outer end thereof for a purpose to be explained hereinafter. Channel member 74 is secured to frame member 42 between sprockets 54 and 56 and has a top flange 76 extending inwardly towards frame member 44. Top flange 76 has a slot 78 formed therein adjacent the outer end thereof in alignment with slot 72.

The numeral 80 refers generally to a plate means which is selectively removably positioned on the cross conveyor 40 at times and generally includes a top 82, bottom 84, ends 86 and 88, and side edges 90 and 92. End 86 is curved downwardly as illustrated in FIGS. 4 and 6 and provides a guide surface for the slats 62 when mounted on the cross conveyor 40 and also prevents material from dropping downwardly between the sprockets 54 and 56. End 88 of plate 80 is also curved downwardly and a pair of notches 94 and 96 are provided at the opposite sides thereof so that the downwardly extending end 88 will act as a guide surface to be explained hereinafter. A pair of pins 96 and 98 are secured to plate 80 and extend downwardly therefrom as illustrated in FIG. 6 and are adapted to be received by the slots 72 and 78 respectively when the plate 80 is positioned on the cross conveyor 40 to detachably maintain the same thereon.

When it is desired to discharge the material from the wagon into an elevator for a blower, the plate 80 is mounted on the cross conveyor or discharge conveyor 40 by simply inserting the same from the discharge end 100 thereof. End 88 of plate 80 is inserted between the sprockets 54 and 56 above shaft 48 so that end 88 is received between the top flanges 70 and 76 and so that side edges 90 and 92 engage the upper surfaces of top flanges 70 and 76 respectively. The fact that end 88 is provided with notches 94 and 96 permits the end 88 to extend downwardly between the inner ends of the top flanges and serve to guide the plate along the channel members 68 and 74 when the plate is being inserted in the cross conveyor 40. The downwardly curved end 88 of the plate 80 also aids in permitting the plate 80 to be inserted beneath the slats 62 as the plate is being inserted in the cross conveyor 40. The plate 80 is moved inwardly into the cross conveyor 40 until the pins 96 and 98 engage the slots 72 and 78 which prevents undesirable movement of the plate 80 with respect to the cross conveyor. The floor conveyor 30, beater assembly 38 and cross conveyor 40 are then activated to cause the material to be conveyed from the interior of the wagon to the cross conveyor 40 and outwardly from the discharge end 100 into the blower or elevator as the case may be. Plate 80 when in position prevents the material from dropping downwardly between the frame members 44 and 42 and insures that the material will be discharged only from the discharge end 100 of the cross conveyor 40.

When it is desired to discharge the material in the box into a trench silo or the like positioned beneath the forward end of the box, it is simply necessary to grasp the plate 80 at end 86 and to deflect the same upwardly to cause the disengagement of the pins 96 and 98 from the slots 72 and 78 respectively. When the end 86 has been so deflected upwardly, plate 80 is simply slidably removed outwardly to the right as viewed in FIG. 3. The floor conveyor 30, beater assembly 38 and cross assembly 40 are then activated to cause the material in the box to be conveyed forwardly to the cross conveyor 40 whereupon the material will drop downwardly between the frame members 42 and 44 rather than being conveyed to the discharge end 100 of the cross conveyor. The moving slats 62 on the cross conveyor 40 will engage the material in the trench silo and will level the upper portion thereof so that the material is evenly distributed therein.

Thus it can be seen that an extremely efficient forage box has been provided wherein material is discharged from the forward end thereof whether the material is to be discharged into an elevator or into a trench silo. The material is efficiently discharged into a trench silo or the like due to the wide front end of the wagon and due to the fact that the beater assembly 38 can also be used to evenly feed the material from the box onto the cross conveyor 40. By providing the removable plate 80, a forage box has been provided which permits the discharge of material from the forward end thereof into a trench silo or into an elevator or the like as the case may be. Thus it can be seen that the forage box of this invention accomplishes at least all of its stated objectives.

I claim:

1. A forage box, comprising,
   a wheeled frame means,
   a box means mounted on said frame means having rearward and forward ends, and opposite sides,
   a powered floor conveyor means movably mounted in said box means adapted to convey material to the forward end of said box means,
   a powered discharge conveyor means extending across the forward end of said box means adapted to receive material from said floor conveyor means, said discharge conveyor means having a discharge end spaced outwardly of one side of said box means,
   said discharge conveyor means comprising first and second spaced apart chains having a plurality of spaced apart slats secured thereto and extending therebetween,
   and a plate means removably positioned between said first and second chains and extending therebetween normally preventing material from dropping downwardly through said discharge conveyor means so that material on said discharge conveyor means will be conveyed to said discharge end, the removal of said plate means from between said first and second chains permitting the material on said discharge conveyor means to drop downwardly through said discharge conveyor means into a material receiving area below the forward end of the box means.

2. The forage box of claim 1 wherein said box means has an increasing width from its rearward to forward ends.

3. The forage box of claim 1 wherein a beater means is mounted in said box means above the forward end of said floor conveyor means adapted to feed the material in said box means to said discharge conveyor means.

4. The forage box of claim 1 wherein said discharge conveyor means includes first and second spaced apart frame members extending transversely to the longitudinal axis of said box means, first and second sprocket operatively rotatably secured to said first frame member adjacent the ends thereof respectively, third and fourth sprockets operatively rotatably secured to said second frame member adjacent the ends thereof respectively, said first chain extending around and between said first and second sprockets, said second chain extending around and between said third and fourth sprockets, a first channel member secured to said first frame member between said first and second sprockets, a second channel member secured to said second frame member between said third and fourth sprockets, each of said channel members having horizontal top flanges extending inwardly towards each other, said plate means being removably mounted on said top flanges and extending therebetween between said sprockets.

5. The forage box of claim 4 wherein said plate means has first and second ends and opposite sides, said first end being positioned adjacent said discharge end of said discharge conveyor means, said second end being positioned adjacent the other end of said discharge conveyor means, said top flanges each having an opening formed therein adjacent said second and fourth sprockets, and a pin element extending downwardly from said plate means adjacent each of its sides into said openings to detachably maintain said plate means on said top flanges.

6. The forage box of claim 5 wherein said second and fourth sprockets are mounted on a first shaft extending between said first and second frame members, said one end of said plate means being curved downwardly to provide a guide surface for said slats and to prevent material from passing downwardly between said second and fourth sprockets when said plate means is mounted in said discharge conveyor means.

7. The forage box of claim 5 wherein said plate means has a downwardly extending guide portion at its second end which extends downwardly of said top flanges, said plate means having a notch formed in each of its sides laterally of said downwardly extending guide portion at the end thereof.

References Cited

UNITED STATES PATENTS 2,837,228   6/1958   Kaster _____ 214—83.18

ALBERT J. MAKAY, Primary Examiner

U.S. Cl. X.R.

198—102; 214—83.18